United States Patent [19]

Furumiya

[11] Patent Number: 5,646,930
[45] Date of Patent: Jul. 8, 1997

[54] RECORDING METHOD AND DISK INCLUDING INITIALIZATION OF RECORDING TRACKS TO AMORPHOUS PHASE WITH A CONSTANT POWER LASER POWER BEAM

[75] Inventor: Shigeru Furumiya, Himeji, Japan

[73] Assignee: Matsushita Electric Industrial Co., Ltd., Osaka, Japan

[21] Appl. No.: 560,483

[22] Filed: Nov. 17, 1995

[30] Foreign Application Priority Data

Nov. 17, 1994 [JP] Japan .................. 6-283409

[51] Int. Cl.⁶ .................................. G11B 7/00
[52] U.S. Cl. ............ 369/116; 369/54; 369/275.2; 369/288; 430/270.13
[58] Field of Search ............... 369/116, 59, 54, 369/57, 124, 288, 48; 430/270.13, 495.1, 945

[56] References Cited

U.S. PATENT DOCUMENTS 5,291,470  3/1994  Nishiuchi et al. .............. 369/116
5,479,392  12/1995  Holtslag et al. ................. 369/116
5,490,126  2/1996  Furumiya et al. ............... 369/116

FOREIGN PATENT DOCUMENTS

62-270024  11/1987  Japan.
1-184631   7/1989   Japan.
3-141028   6/1991   Japan.

Primary Examiner—Georgia Y. Epps
Assistant Examiner—Kim-Kwok Chu
Attorney, Agent, or Firm—Wenderoth, Lind & Ponack

[57] ABSTRACT

A data recording method is provided in which data are recorded on a rewritable optical disk in a form of record marks which are uniform in width, and in which erasability in overwriting is much improved, thus ensuring a high-density storage of the data. A continuous strip of storage area which is smaller in width than a recording track is produced by irradiation of a first laser beam of a constant recording power, and discontinuous regions of the storage area having a width greater than the recording track are crystallized by irradiation of a second multi-value laser beam according to the data. As a result, remaining regions of the storage area are record marks used to represent the data.

4 Claims, 8 Drawing Sheets

RECORDING METHOD AND DISK INCLUDING INITIALIZATION OF RECORDING TRACKS TO AMORPHOUS PHASE WITH A CONSTANT POWER LASER POWER BEAM

BACKGROUND OF THE INVENTION

1. Field of the Invention

The present invention relates to a method of recording data on a rewritable optical disk or more specifically, a phase-change optical disk, and to an apparatus for recording and reproducing the data.

2. Description of the Prior Art

One of recording mediums capable of recording information is known as an optical disk. Namely, phase-change optical disks and opto-magnetic disks which are capable of rewriting data at a higher speed and storing huge amounts of information are widely utilized as video editing apparatuses or storage apparatuses of microcomputers.

Principles of recording on and reproducing from a phase-change optical disk will be explained. The phase-change optical disk has a recording layer made of a metal film e.g. GeTeSb. Recording is made by directing a laser beam intensified with an optical head to a recording track on the recording layer of the disk. When the laser beam is high (as a recording power), it heats up the recording layer to a melting temperature. Upon irradiation of the laser beam being stopped, melted regions of the recording layer are rapidly cooled down and turn to an amorphous phase. When the laser beam is not so high (as an erasing power), it heats up the recording layer to a crystallizing temperature thus turning irradiated spots to a crystallized phase. By irradiating on a rotating disk alternately two, recording and erasing, power modes of the laser beam modulated according to data to be recorded, irradiated spots with the recording power are turned to amorphous phases or recorded regions (marks) and also, irradiated spots with the erasing power are turned to crystallized phases or non-recorded regions (spaces). The phase change can be made from the crystallized phase to the amorphous phase or vice versa. Hence, it is possible to erase any mark on the recording layer and to perform direct overwriting. In overwriting, it is essential for saving data at high accuracy to provide a high degree of erasability which represents a ratio of erased and not-erased portions. For reproducing such phase-change recorded data, a reproducing power of laser beam which is too low to cause a phase change is used. When the reproducing power of laser beam is irradiated, its reflection is large on crystallized spots but small on amorphous spots so that it can read recoded data.

A mark edge recording method is one of most common high-density recording techniques, in which each mark and space represents a train of 1s or 0s and data is assigned to both lengthwise edges at front and rear of the mark. For detecting the mark edge at high preciseness during reproduction, it is substantial in recording to have the mark structured uniformly not only in length but also in width. Accordingly, a shape of the mark is one of fundamental factors for high-density recording.

Figure 2A:
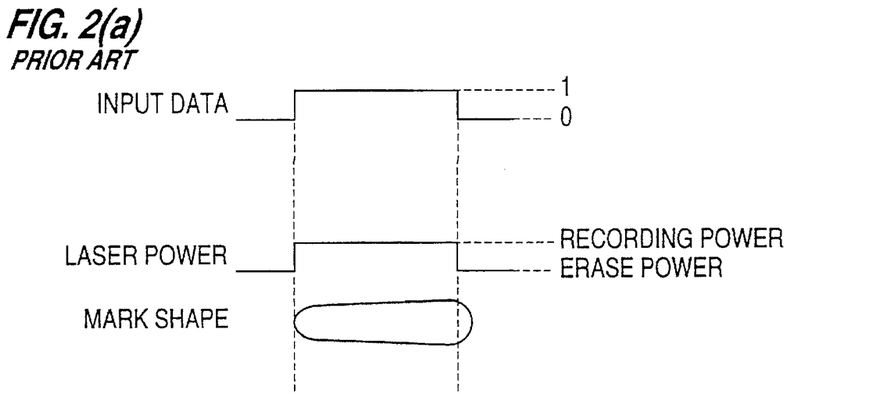
FIGS. 2(a) and 2(b) are schematic views of a conventional recording manner.
Figure 2B:
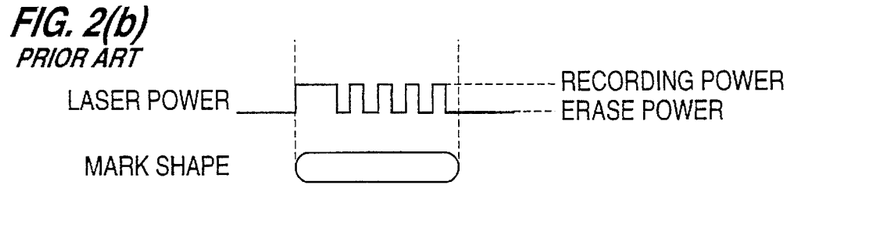

A uniform, correct size of the marks in the mark edge recording method may be built by using a multi-pulse laser beam. As shown in FIG. 2(a), if the recording and erasing power modes of laser beam are simply used for recording of data, a resultant mark is widened at its rear part of the mark due to heat storage effects on the recording layer of a disk, thus having a tear-drop shape. The tear-drop shape causes the rear detection edge to be rearwardly dislocated and may thus create a more number of crosstalk. For compensation, a waveform of the recording power of the laser beam is modified to a combtooth shape by application of multiple pulses, as shown in FIG. 2(b). Accordingly, as a heating to the rear part of the mark is attenuated, the shape of the mark will substantially be uniform in width (see an example of such multi-pulse recording methods depicted in Japanese Patent Application 5-279513 (1993)).

The application 5-279513 explains development of marks with a constant width by controlling the recording power of the laser beam delicately with a recording signal of which waveform has been modified to the combtooth shape. However, any variation in a duty ratio of given pulses or the recording power of the laser beam will affect on the shape of the mark more or less. For example, if the recording power of the laser beam is lowered, the mark may be thinned at its rear part failing to carry data. If the recording power is increased, the rear part of the mark may be enlarged in width. It is requested for forming a uniform, correct size of the marks to carry out precise controlling actions over the recording power of laser beam and a duration of each pulse. More specifically, the above-explained multi-pulse method allows no generous margin of the recording power of the laser beam for error-free assignment of records.

There are proposed some methods of recording at two steps for increasing the erasability in overwriting. An example is disclosed in Japanese Patent Laid-open Publication 1-184631 (1989) in which a first action of the laser irradiation erases the amorphous spots and a second action of the same performs a known recording process to produce a series of amorphous and crystallized spots. It is intended to increase the erasability by repeating the erasing action. A another example depicted in Japanese Patent Laid-open Publication 3-141028 (1991) assigns the amorphous phase to a non-recorded mode (at erased state) and the crystallized phase to a recoded mode, thus ensuring improvement of the erasability as a recorded mode has been turned to a molten state which represents an erased state with the amorphous phase.

Furthermore, Japanese Patent Laid-open Publication 62-270024 (1987) discloses a method in which two time different laser beams, one delayed from the other, are used for crystallization of a specific recording layer which is hardly be crystallized by such a single laser beam. More specifically, a first laser beam is irradiated for heating to an amorphous mode temperature, and after a predetermined time, a second laser beam is applied for addition of supplementary heat so that crystallization is effected.

The methods described in the Japanese Patent Laid-open Publications 1-184631 and 3-141028 may be effective for improving the erasability but fail to have the marks of the mark edge recording produced identical in width. Also, the method depicted in the Japanese Patent Laid-open Publication 62-270024 has no teaching of having the marks arranged uniform in width with any of following cases. It is true that the two laser beams are eligible with a phase-change optical disk which is hardly crystallized by application of a single laser beam because a time difference is given between the two laser beams, and the time difference may arbitrarily be determined when recoding on a phase-change optical disk which is not difficult to be crystallized by a single laser beam. However, the Japanese Patent Laid-open Publications 1-184631, 3-141028, and 62-270024 do not disclose a solution which controls the mark identical in width.

SUMMARY OF THE INVENTION

It is a first object of the present invention to provide a method of recording a data on a rewritable optical disk, in which marks are identical in the width even if a recording power of a laser beam is varied, and the erasability in overwriting is increased.

For achievement of the first object of the present invention, a method of recording data on an optical recording disk which has a recording layer on which a recording track having a specific width is formed, said recording layer being changeable in a physical state by an application of a laser beam, comprises the steps of: irradiating the recording track with a first laser beam having a constant power so as to form a record band which extends continuously along the recording track and which has a width narrower than the width of the recording track; and irradiating the recording track with a second laser beam which is modulated by said data to have a multi-value power so as to form on the record band discontinuous erased areas each having a width which is wider than the width of the record track whereby said data are recorded as record marks in a form of the remaining area of the record band other than the discontinuous erased areas.

Accordingly, the remaining regions are uniform in the width as they are parts of the recording band. The width of each record remains the same regardless of the intensity of the laser beam. Also, as a portion of the recording layer is melted during forming of the recording band, thus allowing none of unerased regions to remain after overwriting and increasing the erasability.

It is a second object of the present invention to provide an optical recording disk capable of recording with one single action of crystallization and ensuring a stable action of tracking control.

For achievement of the second object of the present invention, an optical recording disk has a recording layer on which a recording track having a specific width is formed, said recording layer being changeable in a physical state to be one of a crystalline phase and an amorphous phase by an application of a laser beam, wherein said recording track has been initialized by an application of a constant power laser beam so as to have an amorphous-phase band which extends continuously along the recording track and which has a width narrower than the width of the recording track, the remaining areas in the recording track other than the amorphous-phase band being in the crystalline phase.

Accordingly, it is unnecessary in an initial recording action to form the amorphous-phase band. Records are made only by crystallizing discontinuous regions of the amorphous-phase band by using a single laser beam. Also, as the amorphous-phase band is extended across the recording track surface of the phase-change optical disk, reflected lights between the recording tracks are less varied from each other. This will ensure a stable action of tracking control.

It is a third object of the present invention to provide a data recording apparatus for a phase-change type optical recording disk provided with a recording compensation circuit having a small sized circuitry arrangement for attenuating edge shift and with an optical head producing a single laser beam.

For achievement of the third object of the present invention, a data recording apparatus includes a recording compensation circuit which comprises: a plurality of D-type flip-flops connected in series for producing a series of tap outputs through time delaying an input data by different durations; a pattern detector for producing a pattern match signal and pattern attribute signals when each of the tap outputs is equal to a given value; a ROM for converting the pattern attribute signals to desired delay setting signals; a sample/hold circuit for updating the delay setting signals when the pattern match signal is eligible and holding a preceding value of a respective delay setting signal when the pattern match signal is not eligible; and a programmable delay line for dynamically delaying one of the tap outputs in response to delay setting signals of the sample/hold circuit and delivering a recording signal. The data recording apparatus further comprises: a phase-change type optical recording disk for storage of data by changing a state of a recording layer to amorphous and crystalline phases; a motor for rotating the phase-change type optical recording disk; an optical head for irradiating an intensity of a laser beams to focus a spot on a recording track of the phase-change type optical recording disk; a laser driver means for supplying a current to generate the laser beam; and a recording controller means for switching between two different actions of the laser driver means.

Accordingly, the recording compensation circuit upon detecting a target edge pattern of the data compensates a location of the target edge pattern. Then, the recording controller means instructs the laser driver circuit to perform the first one for forming a continuous strip of the amorphous-phase band and the second one for crystallizing discontinuous regions of the amorphous-phase band according to a recording signal produced by the compensation. This allows the data to be recorded at two steps on the phase-change type optical recording disk by using a single laser beam of the optical head.

It is a fourth object of the present invention to provide a data recording and reproducing apparatus for phase-change type optical recording disk provided with a two-beam optical head which is controlled in the same manner as of a conventional single-beam optical head.

For achievement of the fourth object of the present invention, a data recording and reproducing apparatus for phase-change type optical recording disk includes a two-beam optical head which comprises: a two-beam laser diode having two laser outputs provided independently in a single package; an optical lens for sequentially focusing two laser outputs from the two-beam laser diode on a same recording track of a disk as a primary laser beam and a secondary laser beam and passing respective reflected lights from the disk; a focusing detector for receiving a reflected light of the primary laser beam across a split line between detecting areas and a reflected light of the secondary laser beam within one of the detecting areas; and a tracking detector for receiving the reflected light of the primary laser beam and the reflected light of the secondary laser beam across the split line between the detecting areas, wherein focusing control is implemented using the primary laser beam and tracking control is carried out using both the primary laser beam and the secondary laser beam. Also, the data recording and reproducing apparatus further comprises: a phase-change type optical recording disk for storage of data by changing with irradiation of a laser beam a state of a recording layer to amorphous and crystalline phases; a motor for rotating the phase-change type optical recording disk; a two-beam optical head for irradiating a primary laser beam and a secondary laser beam to a same recording track of the recording layer of the phase-change type optical recording disk; a primary laser beam driver means for supplying a current to generate the primary laser beam; a secondary laser beam driver means for supplying a current to generate the secondary laser beam; a recording controller means for switching between the primary laser beam drive means and the secondary laser beam driver means; a preamplifier for amplifying an output indicative of receiving a reflected light of the primary laser beam to produce a reproduction signal; and a digitalizing means for converting the reproduction signal to a digital data.

Accordingly, using the two-beam optical head for scanning two laser outputs from the two-beam laser diode across the same recording track of the disk, the focusing and tracking controls are made substantially with the reflected light of the primary laser beam. This allows the recording controller means to operate so that, in the recording mode, the primary laser beam is controlled to a recording power for producing on the recording track of the phase-change type optical recording disk a continuous strip of amorphous band which is smaller in width than the recording track and the secondary laser beam is modified with a recording signal to an erase power and a power smaller than the erase power for widely enlarged crystallization of discontinuous regions of the amorphous band so that the remaining amorphous regions are record marks to represent the data, and in the reproduction mode, the secondary laser beam is turned off and the primary laser beam is controlled to a reproducing power for constructing a reproduction signal. As the result, the action during the overwriting will be increased to as a high speed as of the conventional direct overwriting action in the same controlling manner as with the single-beam optical head.

DESCRIPTION OF THE PREFERRED EMBODIMENTS

Figure 3:
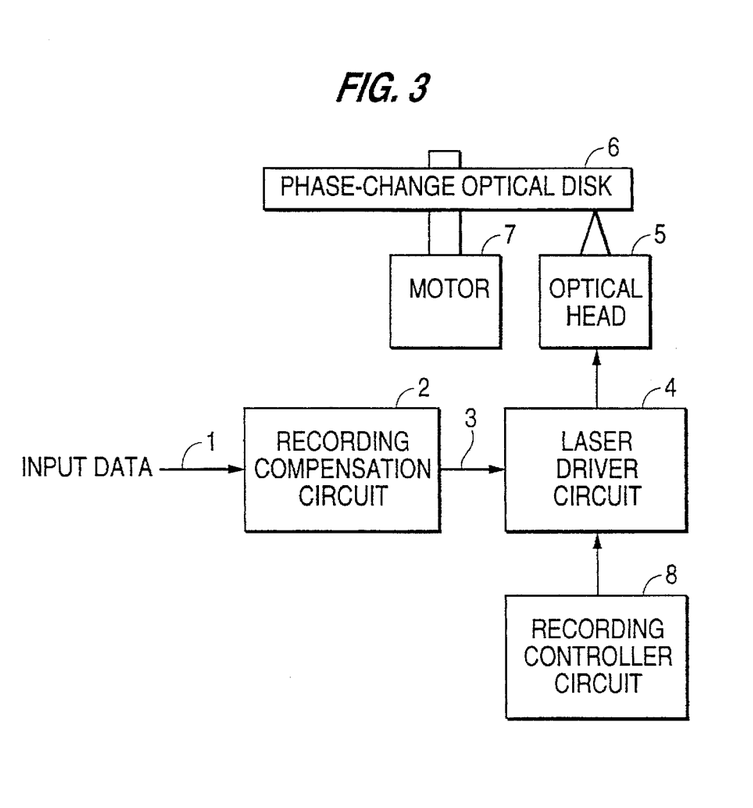
FIG. 3 is a block diagram of a data recording apparatus according to the first embodiment.
Figure 4:
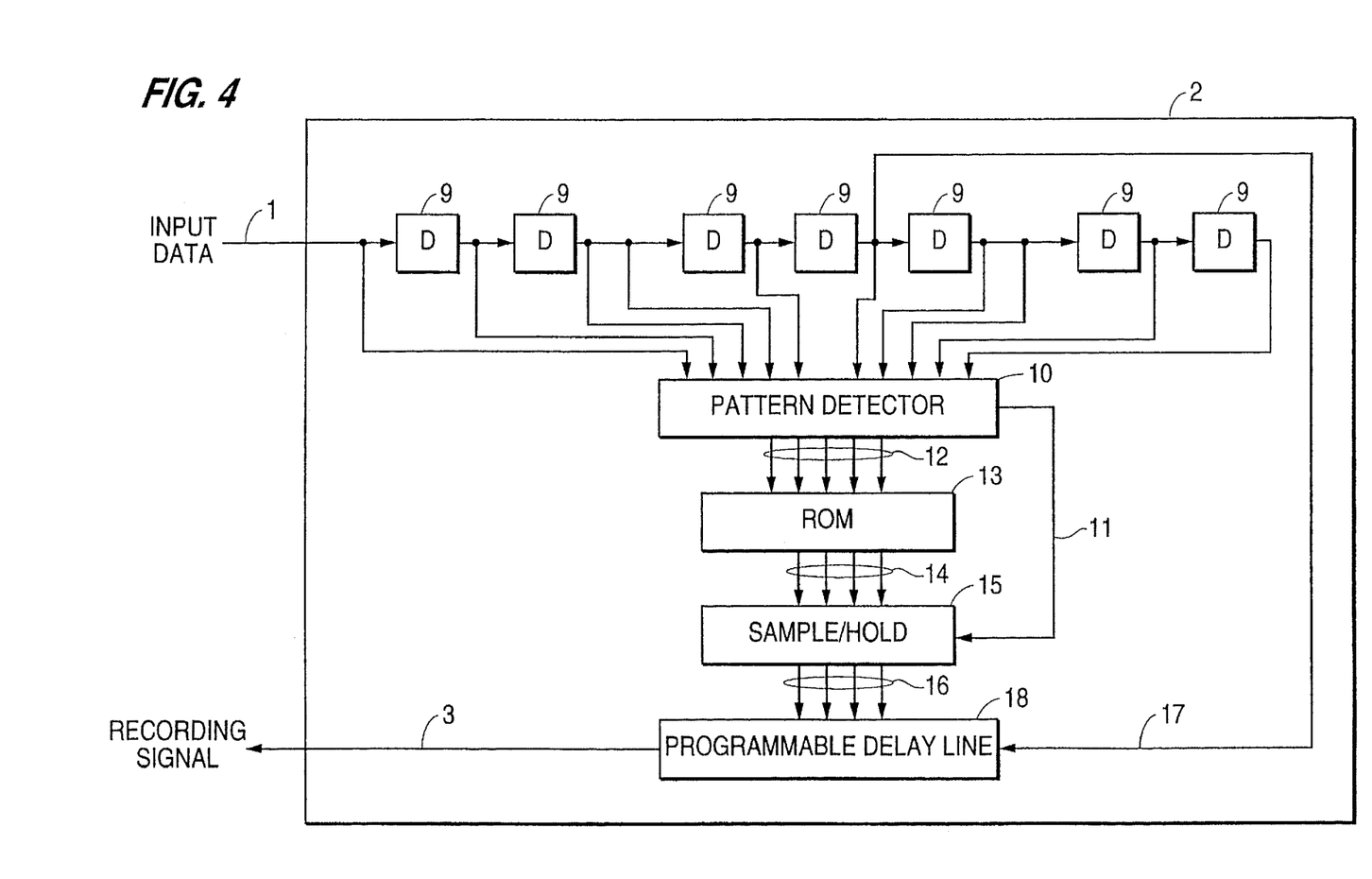
FIG. 4 is a block diagram of a recording compensation circuit according to the first embodiment.
Figure 8:
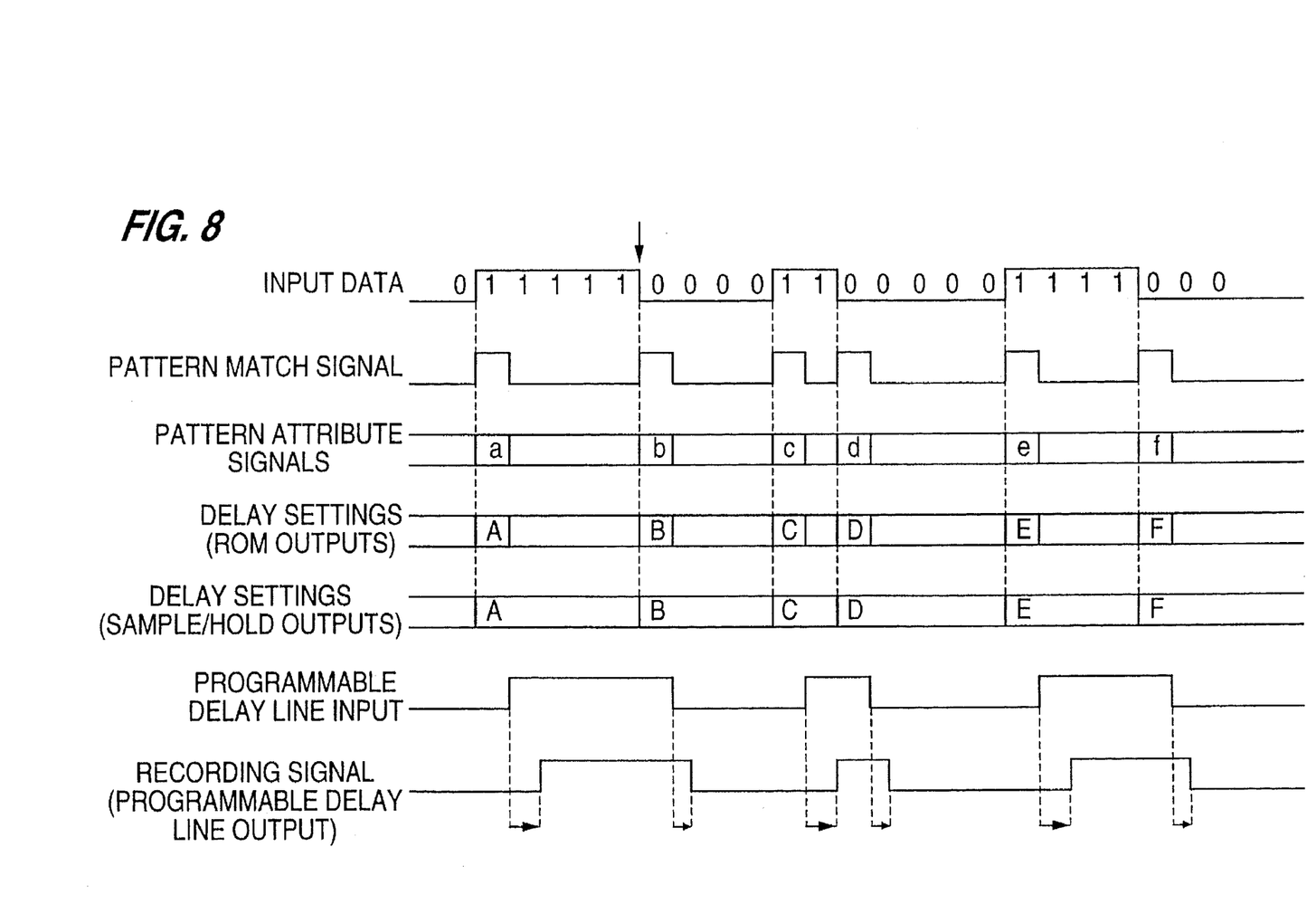
FIG. 8 is a waveform diagram showing an action of the recording compensation circuit of the first embodiment.

A first embodiment of the present invention will be described in a form of a phase-change type optical recording disk. FIG. 3 is a block diagram showing the entire structure of a data recording apparatus for recording data on a phase-change type optical recording disk. FIG. 4 is a block diagram showing a circuitry arrangement of a recording compensation circuit shown in FIG. 4. An action of the recording compensation circuit is illustrated in a signal waveform diagram of FIG. 8. As shown in FIG. 8, the description of the action is made in relation to a specific time denoted by the downward arrow. It is now assumed that a pattern of consecutive bits, 111110000, is provided as an input data 1. The input data 1 is fed in series to a recording compensation circuit 2 where it is subjected to the action of a series of D-type flip-flops 9 and released as parallel tap outputs of a given length. The tap outputs are transferred to a pattern detector 10 which delivers a pattern match signal 11 upon detecting the pattern 111110000 is included in the row of the tap outputs, for example ". . . 011111000001 . . . ". The pattern detector 10 delivers also a group of attribute signals 12 (one being denoted by the letter b at the timing in FIG. 8). The attribute signal 12 at the timing in FIG. 8 indicates that a decay edge appears after five consecutive 1s and is followed by four consecutive 0s. The pattern attribute signals 12 are then converted by a ROM 13 to delay settings signals 14 (one denoted by B at the timing in FIG. 8.) The delay setting signals 14 are then updated by a sample/hold 15 when the pattern match signal 11 introduced at the same time is eligible. More particularly, the delay setting signals 14 are converted to delay setting hold signals 16 which are indicative of shift from previous value to current value (from A to B in FIG. 8). A resultant delayed input data 17 from the D-type flip-flops 9 is transmitted to a programmable delay line 18 where its decay edge is delayed by a predetermined time. Simultaneously, all the edges of rise in the delayed input data 17 are detected and delayed by a specific time to produce a recoding signal 3. In this manner, a recording compensation circuit 2 can provide a recording compensation function for offsetting any shift of mark edge location caused in recording by thermal interference or difference of heat irradiating capability between different sized marks or spaces to be recorded on a disk.

Returning to FIG. 3, the recording signal 3 shifted from the input data 1 by the recording compensation circuit 2 is transferred to a laser drive circuit 4. Also, the action of the laser drive circuit 4 is controlled by a recording controller circuit 8. More specifically, the recording controller circuit 8 provides a first-step recording laser current for allowing an optical head 5 to generate constantly a laser of the recording power mode (enough high to change the recording layer on a phase-change type optical recording disk 6 to an amorphous phase) and a second-step recording laser current for switching between an erase power mode (not too high but sufficient to crystallize the recording layer) and the reproducing mode (low not to change the recording layer) according to the recording signal 3. A desired laser beam produced by the optical head 5 is incident on the recording track of the phase-change optical disk 6 which is being rotated by a motor 7. For recording, the recording controller circuit 8 instructs the laser drive circuit 4 to carry out the first-step recording action on desired one of the recording tracks and then, to perform the second-step recording action on the same track.

Figure 1:
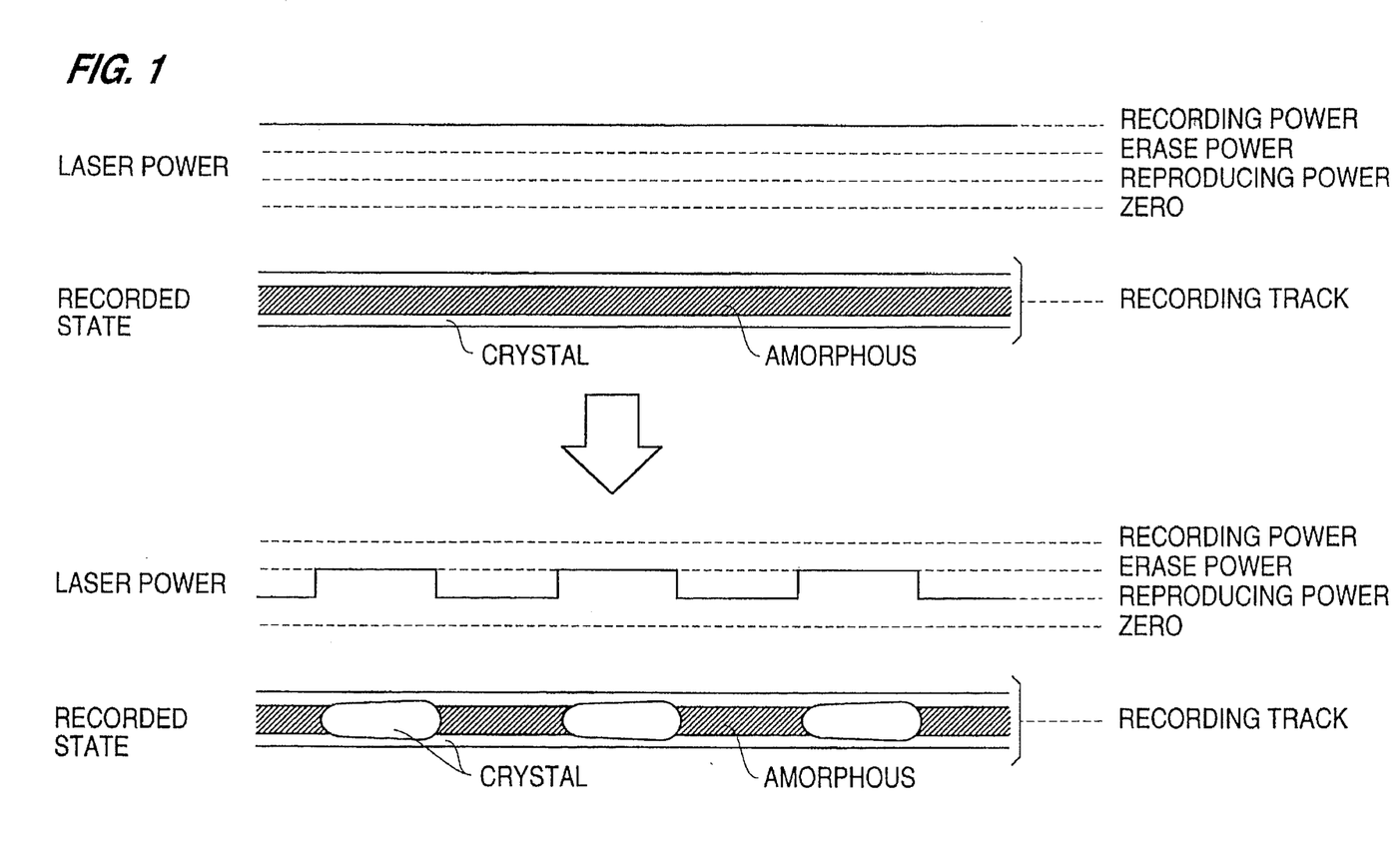
FIG. 1 is a schematic view of a recording manner showing a first embodiment of the present invention.
Figure 9:
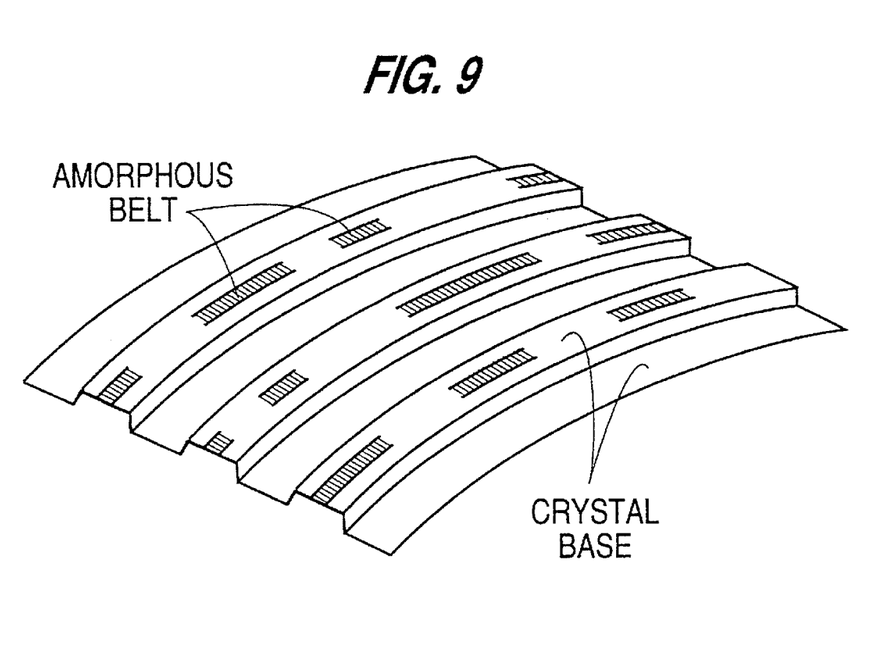
FIG. 9 is an enlarged cross sectional view of a recorded condition of the phase-change optical disk of the first embodiment.

As the result, a given length of an amorphous belt is created on the recording track by the first-step recording action of the phase-change type optical recording disk a data recording apparatus of the present invention using a method of recording data on a phase-change type optical recording disk according to the present invention explained in FIG. 1. Then, a row of record marks are produced by the second-step recording action which crystallizes a row of discontinuous spots on the amorphous belt. FIG. 9 is an enlarged cross sectional view showing an example of the record marks produced on the phase-change type optical recording disk by the method of the present invention. As apparent, the remaining amorphous regions created by crystallizing discontinuous regions of the amorphous recording belt are designated as the marks. The marks are identical in width regardless of their lengths.

Figure 5:
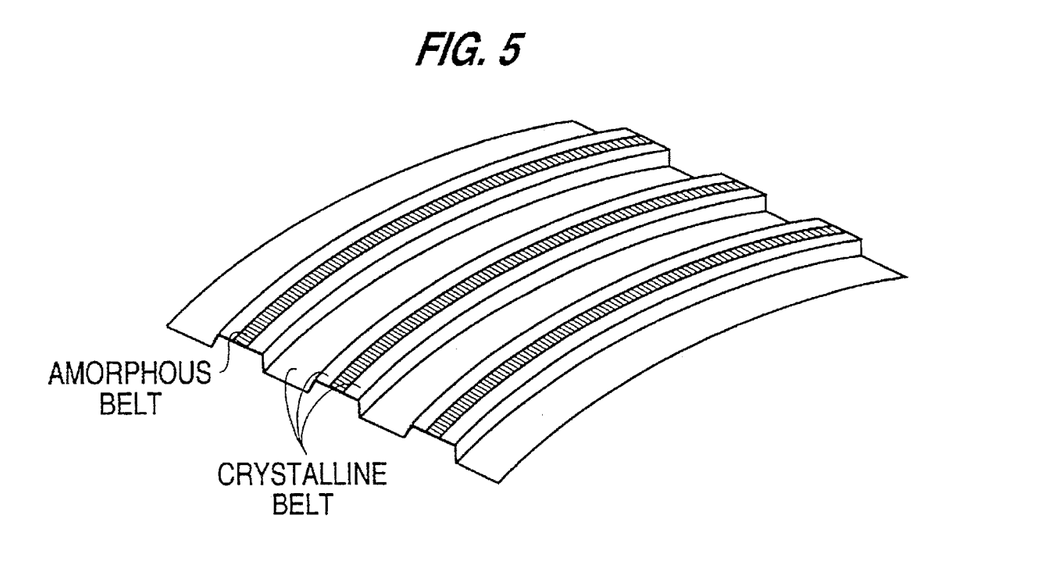
FIG. 5 is an enlarged cross sectional view of an initialized condition of a phase-change type optical recording disk according to the first embodiment.

The phase-change type optical recording disk 6 may be provided with its recording layer initialized by full crystallization. This is advantageous because a very first recording is made by only the second-step recording action and also, tracking control is ensured stable. FIG. 5 is an enlarge cross sectional view of a phase-change type optical recording disk initialized by having continuous lines of the amorphous belt provided on the recording tracks assigned in the crystal recording layer thereof. That disk allows no need of producing the amorphous belt at the very first recording. It is suited for write-once application where after records are created, no erasing is requested. In addition, as the entire recording tracks are provided with the lengths of the amorphous belt, no border is made between the crystallized recording track and the amorphous recording tracks. Also, any two radially adjacent recording track separated by a border created during the recording are substantially similar in the reflectivity. Accordingly, the tracking control will be eased and done with stability.

Figure 6:
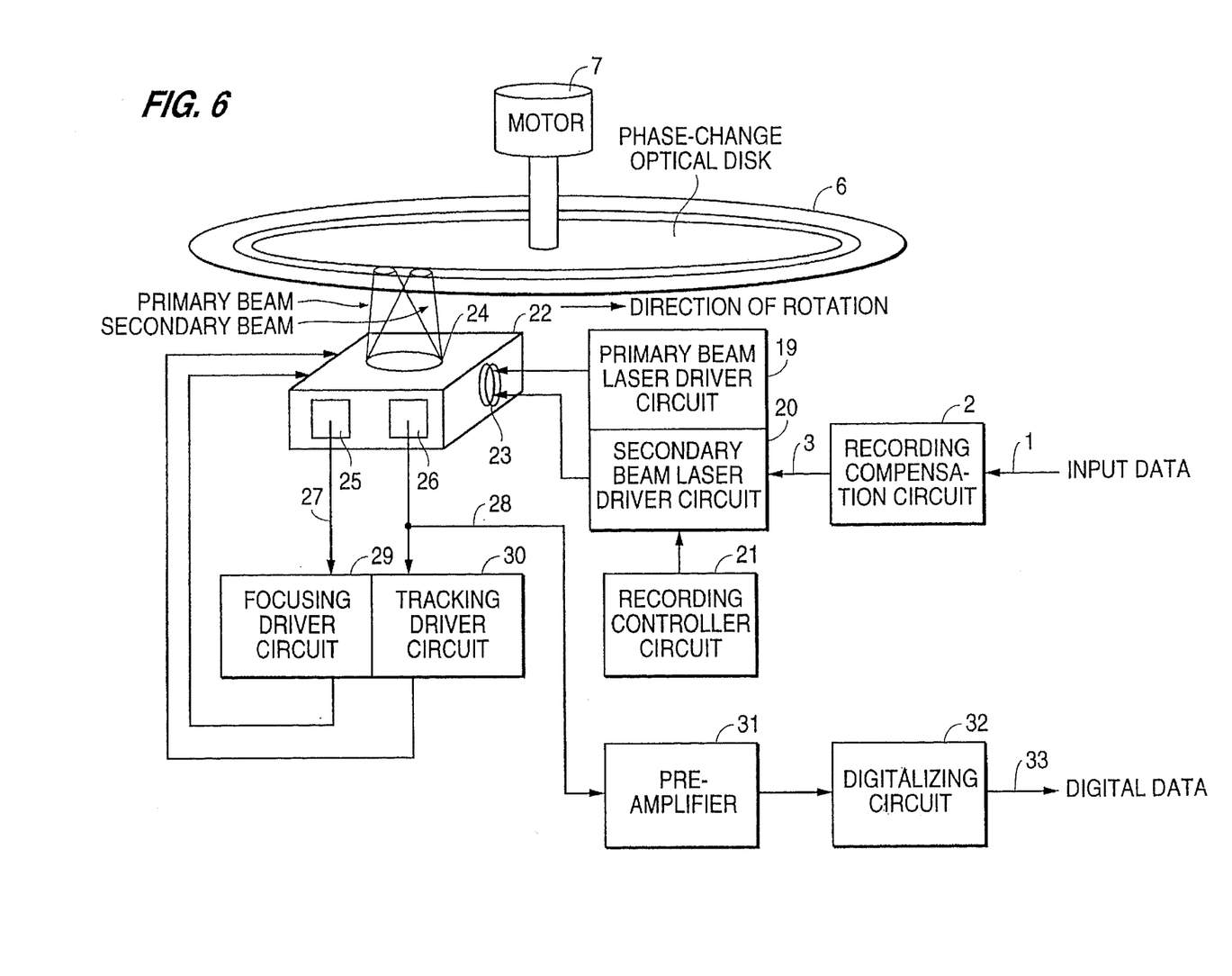
FIG. 6 is a block diagram of a data recording and reproducing apparatus showing a second embodiment of the present invention.

A second embodiment of the present invention will now be described in a form of a data recording and reproducing apparatus for use with phase-change type optical recording disks. FIG. 6 is a block diagram of the data recording and reproducing apparatus for use with the phase-change type optical recording disks. An input data 1 is processed by a recording compensation circuit 2 thus producing a recording signal 3. This processing action is identical to that of the first embodiment and will be no more explained. A primary beam laser drive circuit 19 is provided for supplying a two-beam laser diode 23 with drive currents and causing a first one of its two independent lasers to emit a laser beam of the recording power in the recording mode and of the reproducing power in the reproduction mode. Similarly, a secondary beam laser drive circuit 20 supplies the two-beam laser diode 23 with drive currents and causes a second one of its two independent lasers to switch between the erase power and the reproducing power of laser irradiation according to the recording signal 3 in the recording mode and to generate no laser beam in the reproduction mode. More particularly, the first laser emits a primary beam of laser light for scanning the recording tracks on the phase-change type optical recording disk 6 while the second laser generates a secondary beam of laser light which follows the primary beam along the recording tracks.

Figure 7A:
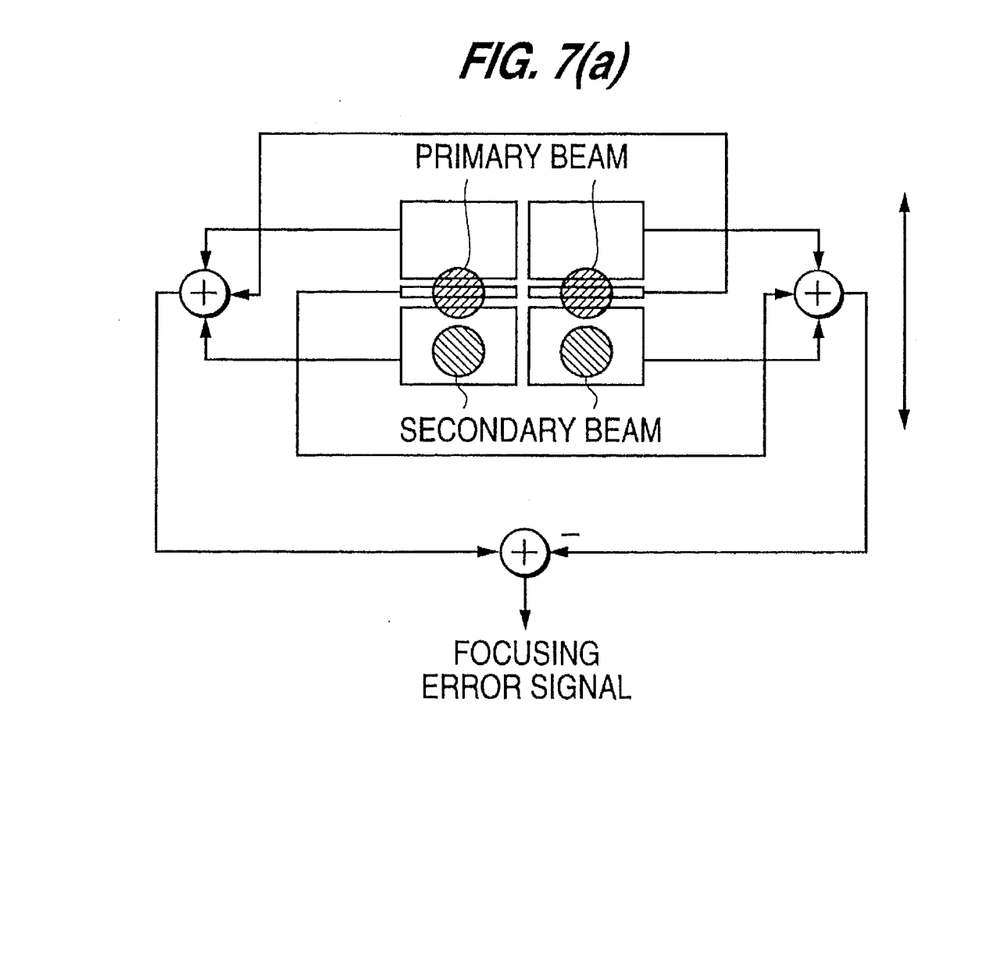
FIGS. 7(a) and 7(b) are schematic views of reflected light detecting mechanisms of a two-beam optical head according to the second embodiment.
Figure 7B:
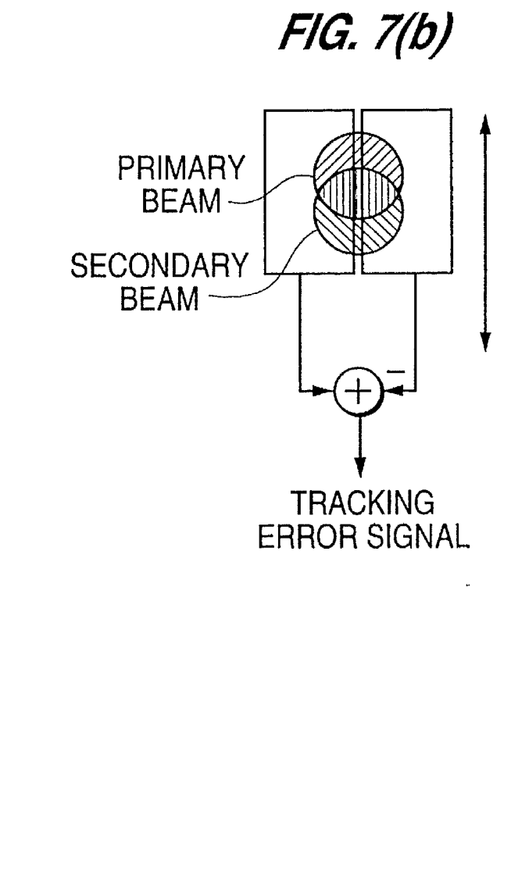

The two-beam optical head 22 will now be explained in more details. A laser output from the two-beam laser diode 23 which comprises a first laser and a second laser disposed independently in one package is focused by an optical lens 24 to scan with its primary and secondary components on one single recording track of the phase-change type optical recording disk 6. A resultant reflected light of the laser output is received by a focus detector 25 and a tracking detector 26. FIGS. 7(a) and 7(b) show their respective detecting actions, where the focusing control is implemented by a 6-split detector of a known spot size detecting mode and the tracking control is performed by a 2-split detector of a known phase-difference detecting mode. (In FIGS. 7(a) and 7(b), the double-headed arrows denote a running direction of the disk.) In the spot size detecting mode for the focusing control, a change in the size of each of the two, left and right, receiving spots is detected to examine a correctness of focusing, as shown in FIG. 7(a). When the size of the receiving spot is changed, the intensity of received light remains unchanged. In action, three detector outputs at each side are summed up and two sums at both sides are compared to calculate a difference which is then released as a focus error signal. While a difference signal is produced from two segments of one reflected light fallen on their respective detectors, two, left and right, reflected lights of the secondary beam are identical in the intensity and their difference will always be zero. In the phase-difference detecting mode for the tracking control, a difference of intensity profile in the receiving spot between the two, left and right, sides is detected to examine an accuracy of tracking. Hence, a difference of the detector outputs between the left and right sides represents a tracking error signal as shown in FIG. 7(b). As two reflected lights of the primary and secondary beams at each side have a common or overlapped region, a resultant tracking error signal can be calculated from mean values of the primary and secondary beams.

The movement of the two-beam optical head 22 is controlled by producing and amplifying the focus error signal and determining with a focusing driver circuit 29 the action of a focusing actuator for the optical lens 24, and by producing and amplifying the tracking error signal and determining with a tracking driver circuit 30 the action of a tracking actuator for the optical lens 24. In the recording mode, a control is implemented by a signal from reflected lights of the primary and secondary beams. In the reproducing mode, the control is carried out by the signals from the reflected lights of the primary beam without serious error.

As the movement of the two-beam optical head 22 is precisely controlled, the recording of data on the phase-change type optical recording disk 6 being rotated by the motor 7 is executed with the primary and secondary beams of laser. As the primary and secondary beams are capable of performing the first-step and second-step recording actions simultaneously, an action of apparent direct overwriting is feasible and the amount of data to be recorded in a given period of time will never be declined.

Also, in the reproducing mode, the recording controller circuit 21 controls the primary beam laser driver circuit 19 for having the primary beam of the reproducing power and the secondary beam laser driver circuit 20 for emitting non of the secondary beam so that the data stored in the phase-change type optical recording disk 6 is reproduced. A sum of tracking reproduced signals 28 is a reproduction signal which is amplified by a preamplifier 31. An amplified output of the preamplifier 31 is transferred to a binary circuit 32 where it is converted by waveform equalization and clock reproduction to a digital data 33. The reproduction signal is not limited to the tracking reproduction signals but may be made from a sum of focus reproduction signals. Any type of the output is feasible, whichever is high in the amplitude and the S/N ratio.

It should be noted for attenuating noise effects on the two-beam laser diode 23 that a high-frequency module, not shown, for superimposing a high frequency component to the laser driving current may be mounted to the primary beam laser but not to the secondary beam laser. Such a noise in the laser beam is unfavorable substantially in the reproducing mode. If the high-frequency module is mounted to the secondary beam laser which performs high-speed switching actions, its static capacitance may interrupt the switching action. It is also understood that the two-beam optical head in the data recording and reproducing apparatus may be replaced with equal success by a pair of single-beam optical heads capable of scanning the same recording track. In this case, one of the single-beam optical heads produces a primary beam of laser while the other generates a secondary beam.

The rewritable optical disk of the present invention is not limited to the phase-change type optical recording disk described with the two previous embodiments but may be a magneto-optical disk or the like whichever is responsive to thermal energy of the laser beam. The intensity of the laser beam for crystallizing discontinuous regions of the amorphous band is classified into an erase power and a reproducing power. The reproducing power may be larger than or equal to zero, or as small as not affecting the amorphous state.

The data recording method for rewritable optical disk according to the present invention allows the marks to be formed uniform in the size by application of a wide range of recording laser beams while such a uniformity of the mark size is hardly achieved in the conventional high-density mark edge recording method. Also, as the marks are uniform in the width, their reproduction signal is not only definite in the edge but also enhanced in the flatness, thus being compatible with the multi-pulse detection. The compensation is performed by a relatively simple circuitry arrangement and will contribute to the costdown of the entire apparatus. As set forth above, the present invention is advantageous in implementing high-density recording and stable action on any rewritable optical disk.

What is claimed is:

1. A method of recording data on an optical recording disk which has a recording layer on which a recording track having a specific width is formed, said recording layer being changeable in a physical state by an application of a laser beam, said method comprising the steps of:

irradiating the recording track with a first laser beam having a constant power so as to form a record band which extends continuously along the recording track and which has a width narrower than the width of the recording track; and irradiating the recording track with a second laser beam which is modulated by said data to have a multi-value power so as to form on the record band discontinuous erased areas each having a width which is wider than the width of the record band whereby said data are recorded as record marks in a form of the remaining area of the record band other than the discontinuous erased areas.

2. A method of recording data on an optical recording disk which has a recording layer on which a recording track having a specific width is formed, said recording layer being changeable in a physical state to be one of a crystalline phase and an amorphous phase by an application of a laser beam, said method comprising the steps of:

irradiating the recording track with a first laser beam having a constant recording power so as to form an amorphous-phase band which extends continuously along the recording track and which has a width narrower than the width of the recording track; and irradiating the recording track with a second laser beam which is modulated by said data to have a specific erase power and a power lower than said specific erase power depending on said data so as to form on the amorphous-phase band discontinuous crystalline-phase areas each having a width which is wider than the width of the amorphous phase band whereby said data are recorded as record marks in a form of the remaining amorphous-phase area of the amorphous-phase band other than the discontinuous crystalline-phase areas.

3. An optical recording disk which has a recording layer on which a recording track having a specific width is formed, said recording layer being changeable in a physical state to be one of a crystalline phase and an amorphous phase by an application of a laser beam, wherein said recording track has been initialized by an application of a constant power laser beam so as to change a crystalline phase thereof to an amorphous-phase along an amorphous-phase band which extends continuously along the recording track and which has a width narrower than the width of the recording track so as to define remaining areas in the recording track which respectively extend continuously on opposite sides of the amorphous-phase band, said remaining areas in the recording track being in the crystalline phase.

4. An optical recording disk which has a recording layer on which a recording track having a specific width is formed, said recording layer being changeable in a physical state to be one of a crystalline phase and an amorphous phase by an application of a laser beam, wherein said recording track has a continuous band which extends continuously along the recording track and which has a width narrower than the width of the recording track, the remaining areas in the recording track other than the continuous band being in the crystalline phase, wherein said continuous band comprises an amorphous-phase part and a crystalline-phase part which are alternately formed in a direction along the recording track by first irradiating the recording track with a first laser beam having a constant recording power so as to form an amorphous-phase band which extends continuously along the recording track and which has the width narrower than the width of the recording track, and thereafter, irradiating the recording track with a second laser beam which is modulated by data to have a specific erase power and a power lower than said specific erase power depending on said data so as to form on the amorphous-phase band discontinuous crystalline-phase areas each having a width which is wider than the width of the amorphous-phase band as said crystalline-phase part.

* * * * *